W. A. KING.
COLLAPSIBLE SEAT.
APPLICATION FILED APR. 29, 1920.
1,373,079.
Patented Mar. 29, 1921.
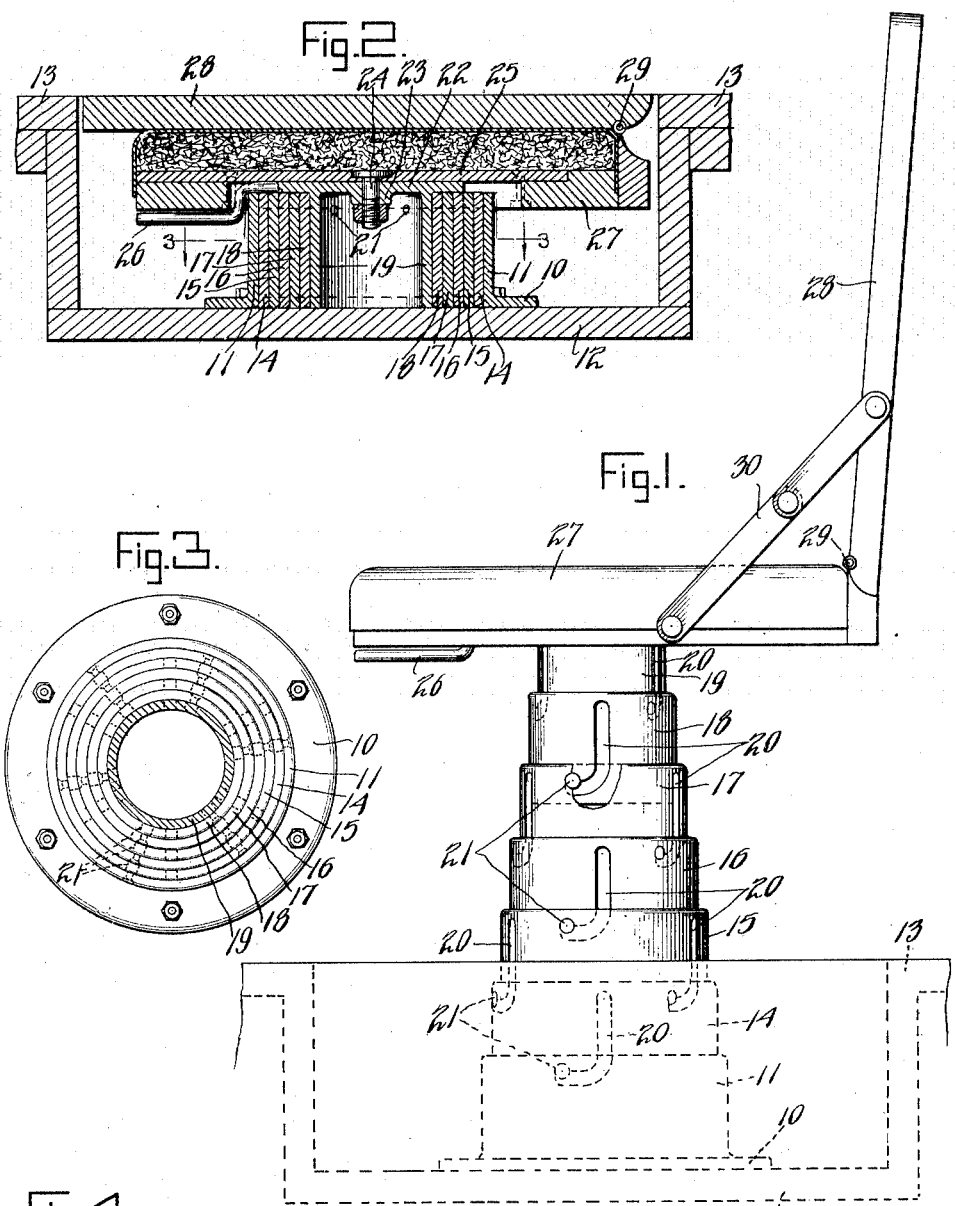
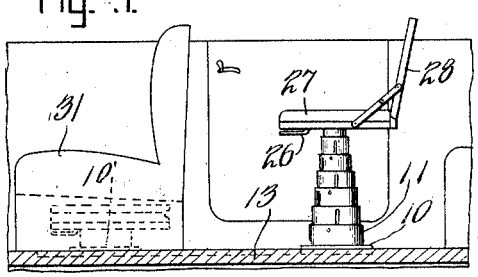
Inventor
William A. King

UNITED STATES PATENT OFFICE.

WILLIAM A. KING, OF MEMPHIS, TENNESSEE.

COLLAPSIBLE SEAT.

1,373,079.  Specification of Letters Patent.  Patented Mar. 29, 1921.

Application filed April 29, 1920. Serial No. 377,613.

*To all whom it may concern:*

Be it known that I, WILLIAM A. KING, a citizen of the United States, residing at Memphis, in the county of Shelby and State of Tennessee, have invented certain new and useful Improvements in Collapsible Seats, of which the following is a specification.

This invention relates to seats and especially, though not exclusively, to auxiliary seats for automobiles, which are collapsible, to occupy reduced space within a boxing in the flooring or under a permanent seat or the like, it being understood, of course, that it is not limited in its scope to use in automobiles but may be employed wherever a collapsible or disappearing seat is desirable.

An object of the invention is to provide a seat-supporting column made up of a plurality of concentric, telescoping sleeves with improved means for retaining the sleeve in elongated or extended relation.

Further object of the invention is to provide improved means for mounting the seat, relative to the telescoping column and with means independent of the seat for controlling rotary movement of the units of the column for locking or unlocking purposes.

With these and other objects in view the invention comprises certain novel units, elements, parts and combinations as will be hereinafter more fully described and claimed.

Referring to the accompanying drawing, which is made a part hereof and on which similar reference characters indicate similar parts, Figure 1 is a view of the device in side elevation, with the supporting column in extended position, Fig. 2 a diametrical, sectional view, showing the parts in closed position, Fig. 3 a top plan view of the telescoping sleeves, taken immediately under the seat-supporting disk, as indicated by line 3—3 of Fig. 2, and Fig. 4 a view in side elevation of the device, showing the manner of mounting where the seat is to be slidably moved under a permanent seat, as distinguished from being concealed in an opening in the floor.

The improved seat, which forms the subject matter of this application, comprises a base 10 carrying, preferably though not necessarily integrally therewith, a sleeve 11.

The base 10 may be secured rigidly to a supporting bottom 12 in a depression or boxing formed in and below the floor 13 of an automobile or, as indicated at Fig. 4, may be mounted to move slidably relative to said flooring 13, to the position 10', indicated in said figure.

Concentrically telescoping with the sleeve 11 is a sleeve 14 with other sleeves 15, 16, 17 and 18 concentrically telescoping each respectively within the other with a final sleeve 19 being the smallest sleeve of the series.

Each of the sleeves 14, 15, 16, 17, 18 and 19 are provided with J-shaped slots 20 while the embracing sleeve is provided with pins 21 proportioned to slide within the slots 20. Any number of the slots 20 may be employed, and showing three of the slots, as is done in the drawings is for the purpose of illustration only and in no way limits the scope of the invention.

The sleeve 19, has, preferably though not necessarily, integral therewith, a seat-supporting disk 22 having a central boss 23 through which the pivot pintle 24 is inserted pivoting thereto the plate 25 forming a part of the seat bottom. The disk 22 is also provided with a radially extending handle 26 whereby the disk, and sleeve 19, may be rotated for the purpose of engaging, or disengaging, the pins 21 from locking in the slots 20.

To the seat plate 25 the seat bottom 27 is secured having a back 28 pivoted thereto, at 29, and with any usual and ordinary limiting means as indicated at 30. As shown at Figs. 1 and 2 the back 28, when folded and the seat lowered, occupies the plane of the floor of the automobile and forms a continuation thereof. In the type shown at Fig. 4 the plane of the back is unimportant except that it shall be so positioned as to be moved under the seat 31.

In operation, with the seat folded to the position shown at Fig. 2, the raising of the seat will automatically rotate the sleeves, so that the pins 21 properly lock in the extremities of the slots 20. For assurance, however, it would not be amiss to apply stress to the handle 26 to insure the proper locking. The back 28 being raised the seat is used in the usual and ordinary manner. When the seat is to be collapsed, movement is applied to the sleeve 19 by stress upon the handle 26 to release the pins 21 from the extremities of the slots 20 and the weight of the device will insure the proper collapsing and telescoping of the several sleeves. The folding of the back will either move such back into correspondence with the bottom of the automobile, as shown at Fig. 2, or permit it being slidably moved under the seat as indicated at Fig. 4.

Having thus fully described my said invention what I claim as new and desire to secure by Letters Patent is,

1. A seat comprising, a plurality of concentric telescoping sleeves some of which are provided with slots in parallelism with the central axes of the sleeves, said slots having off-sets, pins carried by other of said sleeves disposed and slidable within the slots, means carried by one of said sleeves to rotate the column and a seat bottom carried by the uppermost of said sleeves.

2. A seat comprising, a plurality of concentric telescoping sleeves, some of said sleeves being provided with J-shaped slots, pins carried by other of said sleeves extending and slidably movable within the slots, means carried by one of said sleeves to apply manual power to rotate the column to move the pins within the off-set of the slots and a seat bottom carried by the uppermost of said sleeves.

3. A seat comprising, a plurality of concentric telescoping sleeves some of which are provided with J-shaped slots, pins carried by other of said sleeves extending and slidable within the slots, means carried by the uppermost of said sleeves to apply rotary stress and a seat bottom pivotally secured to said uppermost sleeve.

4. A seat comprising, a plurality of concentric telescoping sleeves some of which are provided with J-shaped slots, pins carried by other of said sleeves slidably disposed within the slots, a seat bottom carried by the uppermost of said sleeves and a back member hinged to the bottom.

5. A seat comprising, a plurality of concentric telescoping sleeves some of which are provided with vertical slots having off-sets and others of which are provided with pins slidably disposed within the slots, a seat bottom carried by the uppermost of said telescoping sleeves, and means for guiding the pins down the vertical portions of the slots and into the off-sets thereof for locking the seat in extended position.

In witness whereof, I have hereunto set my hand and seal at Memphis, Tennessee, this 22 day of April, A. D. nineteen hundred and twenty.

WILLIAM A. KING. [L. S.]

Witnesses:
JOHN W. FARLEY,
F. M. BAILEY.